(12) United States Patent
McDaniel et al.

(10) Patent No.: US 6,868,048 B1
(45) Date of Patent: Mar. 15, 2005

(54) DATA STORAGE SYSTEM HAVING THERMALLY ACTIVATED READOUT

(75) Inventors: Terry McDaniel, Morgan Hill, CA (US); Karl A. Belser, San Jose, CA (US); Edward C. Gage, Apple Valley, MN (US); Randall H. Victora, New Brighton, MN (US); James E. Durnin, Apple Valley, MN (US); Charles F. Brucker, Pleasanton, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 454 days.

(21) Appl. No.: 09/777,355

(22) Filed: Feb. 5, 2001

Related U.S. Application Data
(60) Provisional application No. 60/180,297, filed on Feb. 4, 2000.

(51) Int. Cl.[7] .............................................. G11B 11/00
(52) U.S. Cl. ..................................................... 369/13.06
(58) Field of Search ........................... 369/13.35, 13.46, 369/13.51, 13.06, 13.07, 13.08, 13.09, 13.41, 13.42; 428/694 ML, 694 MM

(56) References Cited

U.S. PATENT DOCUMENTS

| | | | | |
|---|---|---|---|---|
| 5,593,789 A | * | 1/1997 | Utsunomiya et al. | 428/694 ML |
| 5,700,540 A | * | 12/1997 | Farruggia et al. | 428/64.1 |
| 5,889,641 A | * | 3/1999 | Belser et al. | 360/313 |
| 6,141,297 A | * | 10/2000 | Kim | 369/13.42 |
| 6,226,233 B1 | * | 5/2001 | McDaniel et al. | 369/13.32 |
| 6,649,254 B1 | * | 11/2003 | Victora et al. | 428/212 |

* cited by examiner

Primary Examiner—Tan Dinh
(74) Attorney, Agent, or Firm—Morrison & Foerster LLP

(57) ABSTRACT

Embodiments of a data storage system having thermally activated readout are provided, in one embodiment, a data storage system includes a source of heat, a substrate, a write layer disposed above the substrate, a copy layer disposed above the write layer, a flying head disposed above the layers and carrying the source of heat for heating a selected spot on the copy and write layers, wherein the write layer comprises a ferromagnetic material selected to have an extremely high coercivity at room temperature and a very high write temperature $T_{write}$, and the copy layer comprises a ferromagnetic material selected to have a coercivity always less than coercivity of the write layer at the same temperature and a copy temperature $T_{copy}$ substantially less than the write temperature of the write layer.

50 Claims, 4 Drawing Sheets

(b) OAMR Media Thermal Profiles

DATA STORAGE SYSTEM HAVING THERMALLY ACTIVATED READOUT

CROSS-REFERENCE TO RELATED APPLICATIONS

This invention is based on U.S. Provisional Patent Application Ser. No. 60/180,297 filed Feb. 4, 2000, entitled MEDIA FOR THERMALLY ASSISTED WINCHESTER WITH THERMALLY ACTIVATED READ STORAGE SYSTEM filed in the name of Terry McDaniel, Karl A. Belser, Edward C. Gage, Randall H. Victoria, James E. Dumin, and Charles F. Brucker. The priority of this provisional application is hereby claimed. This application is also related to U.S. patent application Ser. No. 09/777,220 filed Feb. 5, 2001 in the name of R. A. Victora, et al., and assigned to the assignee of this invention and incorporated herein by reference which describes thermally assisted magnetic recording media. The media is useful in a system such as described in Belser U.S. Pat. No. 5,889,641 incorporated herein by reference.

FIELD OF THE INVENTION

The present invention relates to a thermally activated read data storage system and relates more specifically to media for use in such a system.

BACKGROUND OF THE INVENTION

Disc storage systems are well known in the art and are used to store information for later retrieval. Such disc storage systems include a rotating disc which carries information thereon and a transducing head positioned over a surface of the disc while the disc rotates at high speed. The head is carried on a slider which is designed to "fly" just over the surface of the recording disc. The head may be used to write information onto the disc and/or read information from the disc. While such systems have become increasingly sophisticated, the problems with increased storage density have become more difficult to solve. Specifically, one of the problems is called the superparamagnetic limit, which may be generally characterized by the fact that as bits shrink in size, their long-term stability at system temperature diminishes. This means that recorded information will degrade over time, and in the worst case, will self-erase. To combat this tendency, the coercivity of magnetic media must be increased. This makes the recording process more difficult since magnetic heads have limited magnetic field output. As a potential solution to this problem, a technology called thermally-assisted recording is receiving attention. In this system, writing is accomplished via magnetic field modulation over a magnetic medium with vertical magnetization, and a coercivity that is decreased by local heating. The local heating may be applied via a standard magneto-optical (MO) head. (H. Saga, H. Nemoto, H. Sukeda, and M. Takahasi, "A New Recording Method Combining Thermo-Magnetic Writing and Flux Detection," paper Pd-08 ISOM '98; H. Nemoto, H. Saga, H. Sukeda, and M. Takahashi, "Exchange-Coupled Magnetic Bilayer Media for Thermomagnetic Writing and Flux Detection," paper Pd-09 ISOM '98; and S. R. Cumpson, P. Hidding, and R. Coehoorn, "A Hybrid Recording Method Using Thermally Assisted Writing and Flux Sensitive Detection," IEEE Trans. Magn., 2000 incorporated herein by reference.) By incorporating a GMR (giant magnetoresistive) read sensor into the transducing head, system advantages in signal-to-noise ratio (SNR) and resolution (signal roll off with feature size) can be achieved. The medium can be separately optimized for writing and reading if a dual magnetic layer structure is employed, including a memory layer for data storage and a read layer for readback. The reading process comprises heating the media in the region to be read to a temperature such that the read layer replicates the domain structure of an underlying write (memory) layer on the disc of the addressed data track. The room temperature coercivity of the read layer is chosen so that it is not affected by the write layer, but is switched by the bias magnet. The two layer medium may be composed of a high coercivity MO-like (ferrimagnetic) layer and an intermediate coercivity (ferromagnetic) read layer. The read layer is heated by the read optical beam, thereby replicating the magnetization contained in the write layer to be read only across the track of interest, which may be less than the width of the GMR sensor. Obviously, in a system such as this, optimizing the properties of the disc to be used is essential. It is especially important to optimize the thermal properties of the disc for reading and writing.

SUMMARY OF THE INVENTION

It is an object of the present invention to provide an improved storage system employing thermally-assisted recording and thermally-activated readout.

More particularly, it is an object of the present invention to provide an improved optically assisted magnetic recording (OAMR) media design.

In the present invention, the media comprises a sequence of layers beginning most distant from the transducer with a substrate, reflector layer, dielectric layer, memory layer, exchange layer, readout layer, carbon overcoat and lubrication layer.

According to the present invention, the medium is characterized by a Co/Pt readout layer on a TbFeCo memory layer. This medium was chosen to provide a temperature dependence of coercivity which is intended to enhance and cooperate most fully with the operation of the thermally activated readout storage system. In a preferred embodiment of the invention, a Pt coupling layer is provided between the readout layer and the memory or write layer. This coupling layer preferably has a thickness of between 0 nm and 5 nm; preferably, the coupling is enhanced by providing a layer thickness of between 0.5 nm and 10.0 nm.

The disc of the invention can well be used in a thermally-activated system wherein the read/write head includes a recording coil with coaxial focused light (although the system is also compatible with a gap or pole magnetic recording head integrated with a light delivery source). Additionally, an aperture at the base of the slider can be used to define the size and shape of the optical spot incident on the medium. During reading, the medium is heated to a temperature such that the uniformly magnetized read layer (which is typically magnetized by a separate bar magnet) replicates the domain structure of the underlying write layer of the addressed data track. The room temperature coercivity of the read layer is chosen so that it is not affected by the write layer, but is switched by the bias magnet. This two layer medium comprises, as specified above, a high coercivity write layer and an intermediate coercivity read layer. In reading, the read layer is "written" by the read optical beam from the write layer, thereby replicating the magnetization stored in the write layer to be read by the sensor.

Other features and advantages of the invention will become apparent to a person of skill in the art who studies the subject invention disclosure, which is given with respect to the following drawings.

DETAILED DESCRIPTION OF A PREFERRED EMBODIMENT

Figure 1:
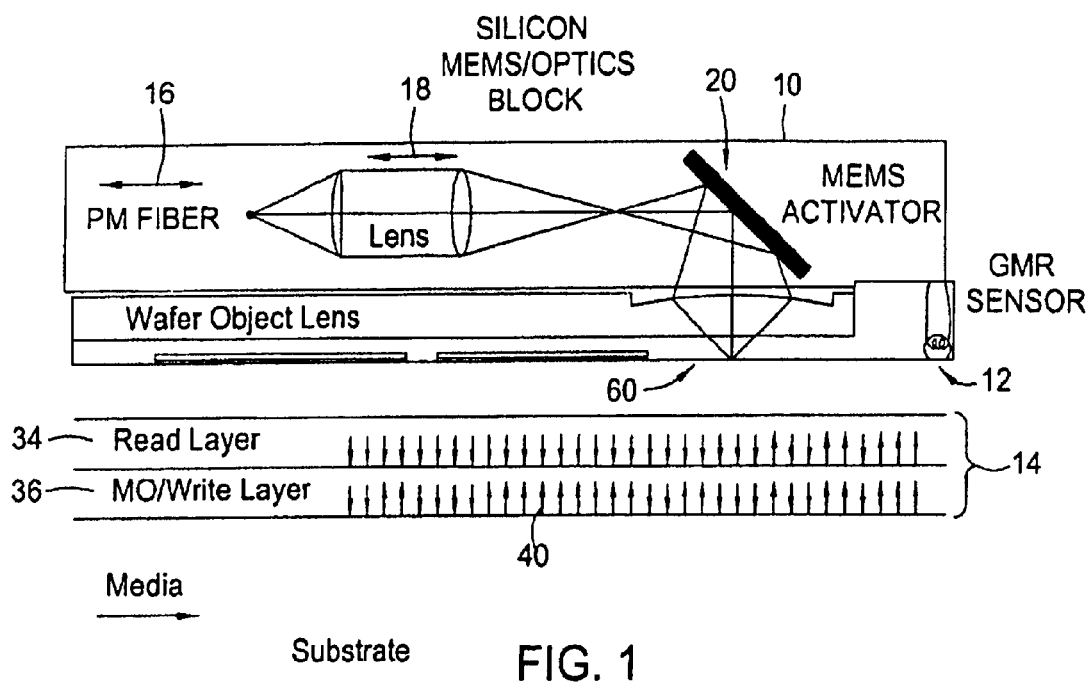
FIG. 1 is a schematic view of a magneto-optical recording system in which the present invention is useful

Thermally-assisted recording on high coercivity media has been described in the publications referenced above as a potential solution to the medium thermal stability issue. In this system, writing is accomplished via magnetic field modulation applied to a magnetic medium with a coercivity that is decreased by local heating. The local heating may be applied via a standard MO head (see Saga et al. and Nemoto et al.) or some integrated optical source.

The system includes an optical delivery system 10 with a GMR sensor 12 on the slider trailing edge interacting with a disc 14 (only 2 layers are shown). The delivery system 10 includes a light source which may be an optical fiber 16 conveying light to microlens 18. The light is reflected off a movable mirror 20. This system would allow a wide GMR sensor 12 to read only the narrow data track on disc 14. Coarse (first-stage) tracking is done in the usual manner by actuating the head stack 10. Fine (second-stage) tracking is performed by using the micro-mechanical actuator directing mirror 20 to scan the optical spot in the cross-track direction, thereby allowing a track to be read out at any point along the entire width of the GMR sensor 12. High cross-track density is therefore achievable.

Figure 2:
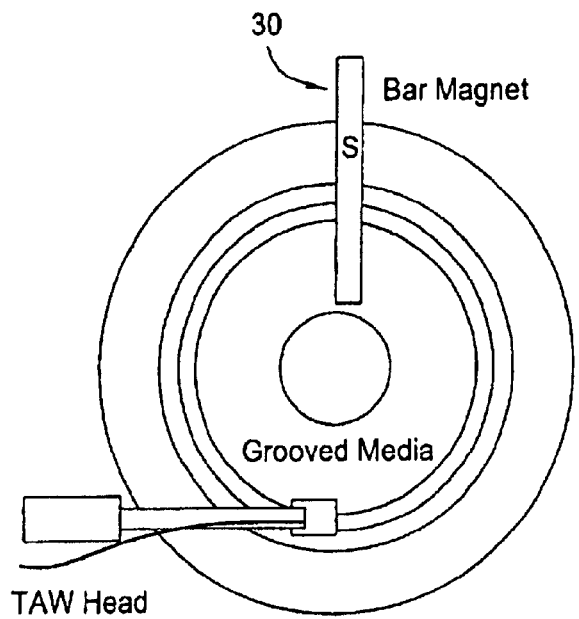
FIG. 2 is a plan view of an OAMR system using grooved media.

The system also has a "refresher" magnet 30 that erases the read layer 34 at each pass as shown in FIG. 2. The writing process is identical to that of OAW technology. The write/MO layer 36 is heated above the Curie temperature. The domains 40 are frozen during the cooling process and aligned with the field from the on-head MFM coil. This crescent mark recording allows very short marks to be written. The actual mark shape is determined by media thermal properties, media velocity, laser write strategy, and coil modulation and field. After each domain is written, read, or erased, the read layer 34 is uniformly aligned by the bar magnet.

The read process is shown in FIG. 2. During read, the media is heated to a temperature such that the uniformly magnetized read layer 34 replicates the domain structure of the underlying write layer of the addressed data track (see region 50 of FIG. 1). In effect, this is a GMR readout equivalent to optical CAD MSR (center aperture detection magnetic super-resolution) media. The room temperature coercivity of the read layer is chosen so that it is not affected by the write layer but is switched by the bias magnet. The two-layer medium consists of a high coercivity MO like layer and an intermediate coercivity read layer. The read layer 34 is switched by the write layer 36 under the influence of heating by the read optical beam 60, thereby replicating the information contained in the write layer to be read somewhere across the width of the GMR sensor 12.

Grooves are used on the media to provide: 1) an optical tracking signal, 2) thermal isolation between nearest neighbor tracks, 3) reduced flying height variation when crossing sector headers, and 4) "pinning" of mark edges to reduce readout noise. Track sensing could be performed by processing an error signal derived from reflected light read back optically through the fiber. By confining the domains in the cross-track dimension using grooves, the noise into the GMR sensor from the uniformly magnetized background can be minimized.

Figure 3:
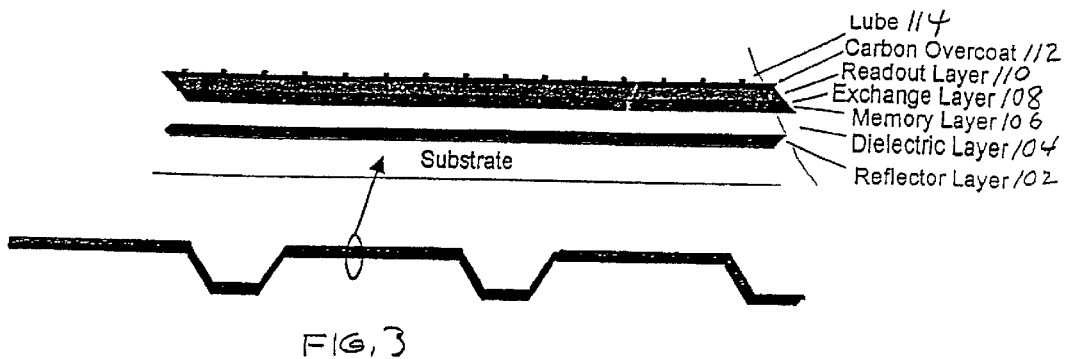
FIG. 3 is a vertical sectional view of the sequence of layers in a OAMR system.

The general medium design for use in such a system is shown in FIG. 3. The medium includes in succession, beginning from a substrate 100 and enumerating upward toward the read/write optics, the following layers:

Lube 114
Carbon Overcoat 112
Readout Layer 110
Exchange Layer 108
Memory Layer 106
Dielectric Layer 104
Reflector Layer 102

Figure 4:
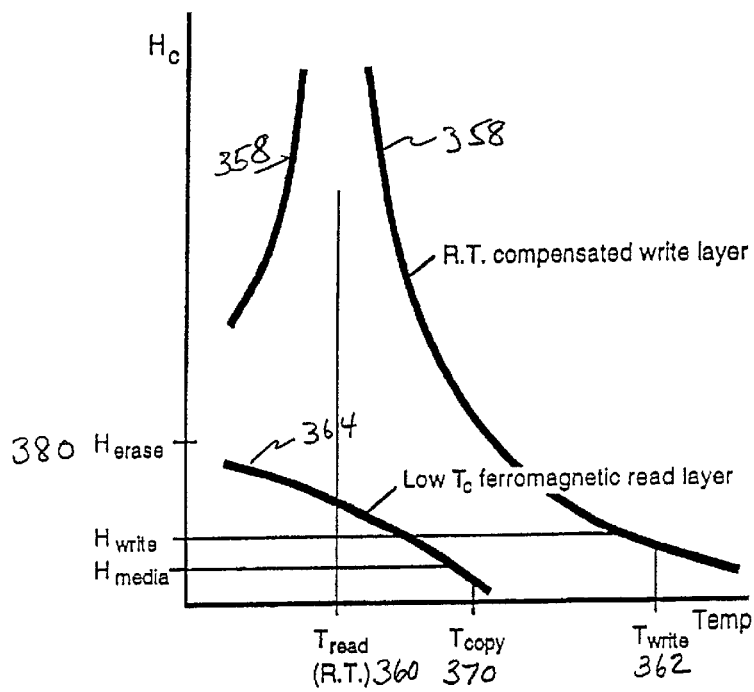
FIG. 4 illustrates the medium thermal profiles for the write and read layers of the OAMR media of the invention.

The medium type which is included herein preferably includes a (Co/Pt readout layer on a TbFeCo memory or write layer. In a preferred form, an exchange or coupling layer 108 is provided. This medium type was chosen to provide a temperature dependence of coercivity as schematically depicted in FIG. 4. The principle of operation is briefly described followed by experimental results.

Writing is accomplished by heating the memory layer, a ferrimagnetic material exhibiting compensation behavior, to a temperature $T_{write}$ in the vicinity of the its Curie temperature. In practice, $T_{write}$ would be determined by the temperature at which the record head field $H_{write}$ exceeds the coercivity for the memory layer, much like magneto-optic recording with magnetic field modulation. In order that the memory layer be "invisible" during readback (to avoid adjacent track "noise"), the compensation temperature for the memory layer is arranged to be near ambient temperature so as to provide minimal detectable flux at the read head. The high coercivity at the compensation temperature also enhances archival stability against thermal decay and external magnetic fields, including the strong field of the erase magnet.

FIG. 4 is a profile of coercivity as temperature for the two materials chosen for the write or memory layer 36 and the read or copy layer 34. The coercivity characteristic 358 of the write layer 36 is ideally extremely high in the temperature around room temperature (R.T.) 360; this insures stable data storage during normal drive operation.

The memory layer 36 also has a relatively high temperature $T_{write}$ 362 at which the data can be recorded.

The read or copy layer has a thermal profile 364 which at each temperature, lies below the profile of the write layer. Therefore, the read layer 34 can be copied at a temperature $T_{copy}$ 370 which is substantially lower than the temperature $T_{write}$ 362 at which the write layer can be written.

Utilizing these temperature relationships, when the light 152 is focused on a stored bit 153 in write layer 106, it heats that layer to a temperature greater than $T_{copy}$ 370 but less than $T_{write}$ 362. At this temperature, the intermediate field coupling between the layers copies the bit into read layer 110. As the disc moves away from the light source 152 past read head 154, the temperature of the read layer is at or above $T_{read}$ 360 allowing the bit to be read. At the same temperature, the coercivity of the write layer has increased dramatically, so the state of the bit in write layer 106 is not altered.

Finally, the disc moves the regions of the copy layer 110 whose status have been altered past erase head 180. The head is of sufficient strength $H_{erase}$ 35 relative to the coercivity of the read layer 110 to erase this layer (regardless of layer temperature) without altering the bits stored in write layer 106.

Figure 5:
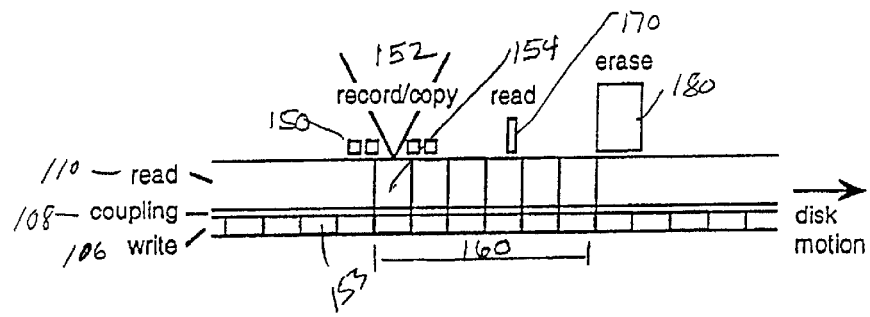
FIG. 5 is a schematic of the recording system utilizing the medium of this invention.

The basic elements of the record/readback system are shown schematically in FIG. 5. In FIG. 5, an OAW recording coil with coaxial focussed light is shown, but the system is also compatible with a gap or pole magnetic recording head integrated with a light delivery means. Additionally, an aperture at the base of the slider can be used to define the size and shape of the optical spot incident on the media. In one embodiment, a rectangular aperture overfilled by the incident focused beam is used to define the spot shape both cross-track and in-track. In another embodiment, a slit aperture oriented along the cross-track dimension would define the in-track optical spot size while still permitting optical tracking of the spot along the cross-track direction. Or, some other near-field optical source could be employed to achieve the desired optical beam size and shape. As described above, the memory or write layer 106 is heated by indirect light spot 152, copying the data through exchange layer 108 to read layer 110 in region 60. The read head 170 reads the data, and the read layer 110 is erased by magnet 180.

The read layer 110 comprises a ferromagnetic material with high magnetic moment, moderate coercivity, and relatively low Curie temperature. The ambient temperature coercivity is such that the read layer is erased by the erase magnet 180 yet stable against the coupling field of the memory layer, i.e., $H_{media} < H_{c,ambient} < H_{erase}$. Domains are written into the read layer 110 by heating to a temperature $T_{copy}$ such that the coercivity is less than the coupling field of the memory layer, i.e., $H_{c,copy} < H_{media}$. Practical values for $H_{c,ambient}$ and $T_{copy}$ are considered to be 1–2 kOe and about 150 C, respectively.

Figure 6:
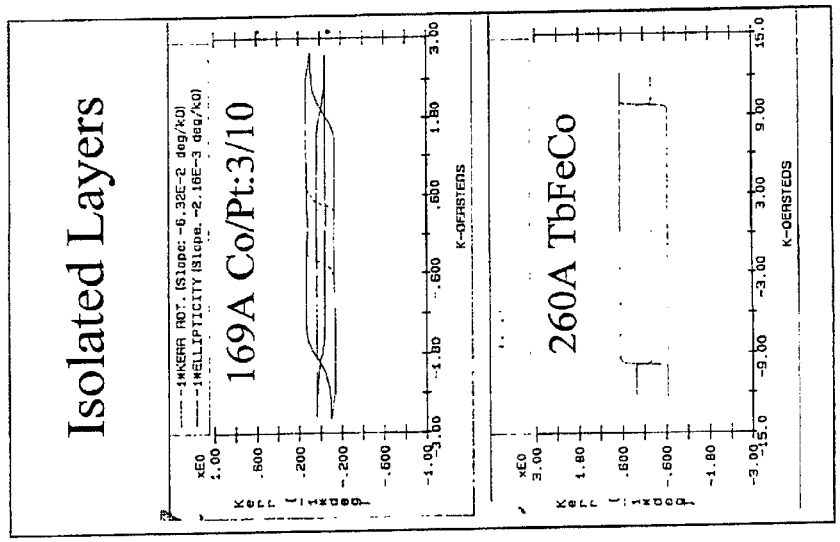
FIG. 6 illustrates the hysteresis loops for the write and read layers of the invention.
Figure 6:
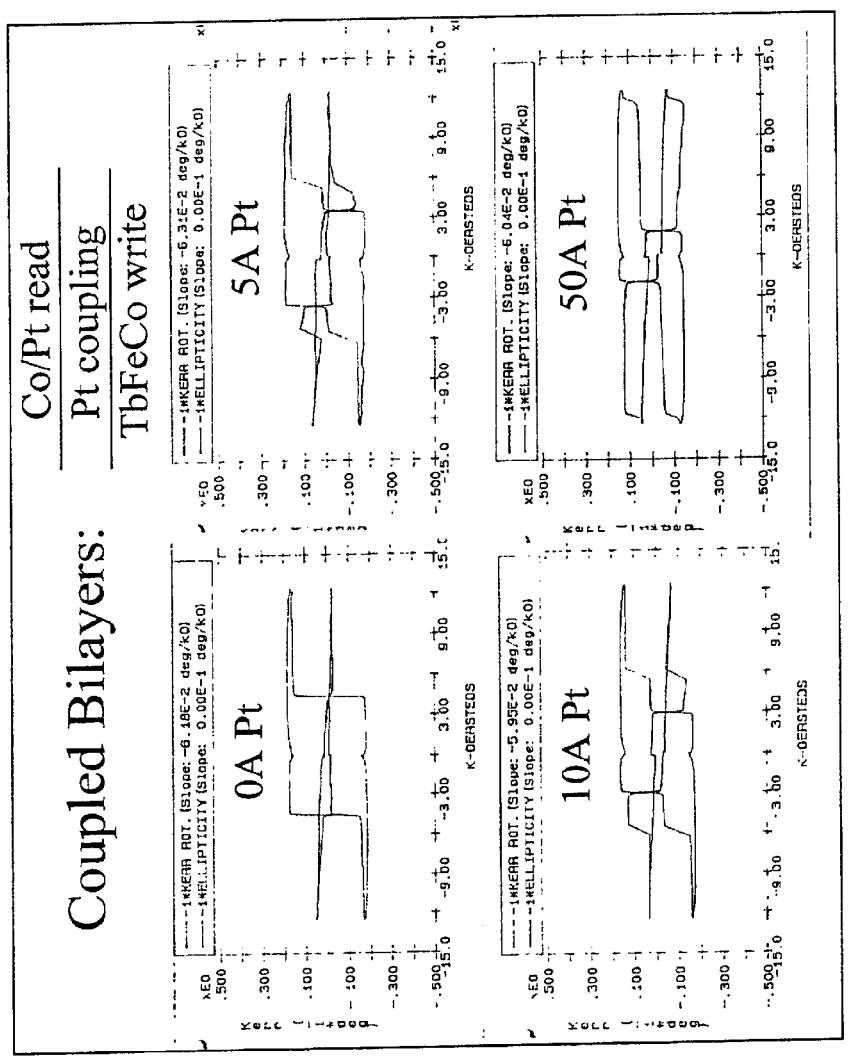

A TbFeCo alloy, a compensated ferrimagnetic material used for perpendicular magneto-optic recording, was chosen for the memory layer 106, and Co/Pt, a ferromagnetic material with perpendicular magnetic anisotropy, for the read layer 110. FIG. 6 shows polar Kerr hysteresis loops for the isolated layers (right) and for the coupled layers (left). An interlayer of Pt was included to mediate the coupling between layers, i.e., as exchange layer 108. For a Pt interlayer thickness of 0 nm, the bilayer is observed to switch as a single unit, which is attributed to strong exchange coupling between the Fe sublattice of the TbFeCo memory layer and the Co lattice of the Co/Pt copy layer. For a Pt interlayer thickness of 5 nm, two characteristic switching fields are observed which are nearly the same as those for the isolated layers (Note that the isolated Co/Pt loop, upper right, is plotted with an expanded field axis scale.). This is attributed to a decoupling of the exchange interaction between the layers. For a Pt interlayer thicknesses of 0.5 to 1.0 nm, intermediate levels of coupling are observed.

In FIG. 6, measured polar Kerr hysteresis loops (light wavelength=633 nm) for isolated Co/Pt and TbFeCo layers (right) and coupled layers (left) are shown. The Co/Pt, which comprises 0.3 nm Co/1.0 nm Pt repeated 13 times, was fabricated by dc magnetron co-sputtering from elemental Co and Pt targets onto a rotating substrate. The sputtering pressure was 20 millitorr Kr, the source-to-substrate distance was 6.4 cm, and a Pt seed layer was used to promote the desired polycrystalline texture. The TbFeCo composition was approximately $Tb_{24}Fe_{69}Co_7$ at %.

One notable and unexpected feature in FIG. 6 is the presence of good perpendicular anisotropy for Co/Pt, which is polycrystalline, when deposited on TbFeCo, which is amorphous. Prior to this, the inventors are not aware of any experimental success in growing Co/Pt on amorphous TbFeCo. Furthermore, the observed coercivity for the Co/Pt layer is in the desired 1–2 kOe range for proper copy layer function, as described above.

An important design criteria is that the margin between $T_{copy}$ and $T_{write}$ be sufficient for stability of the memory layer during read. One concern with the Co/Pt copy layer is that $T_{copy}$ may be too high for adequate margin. It is suggested, therefore, that Fe/Pt or CoFe/Pt, which can show a steeper drop in coercivity with temperature compared to Co/Pt, could be developed as an alternative copy or read layer.

Figure 7:
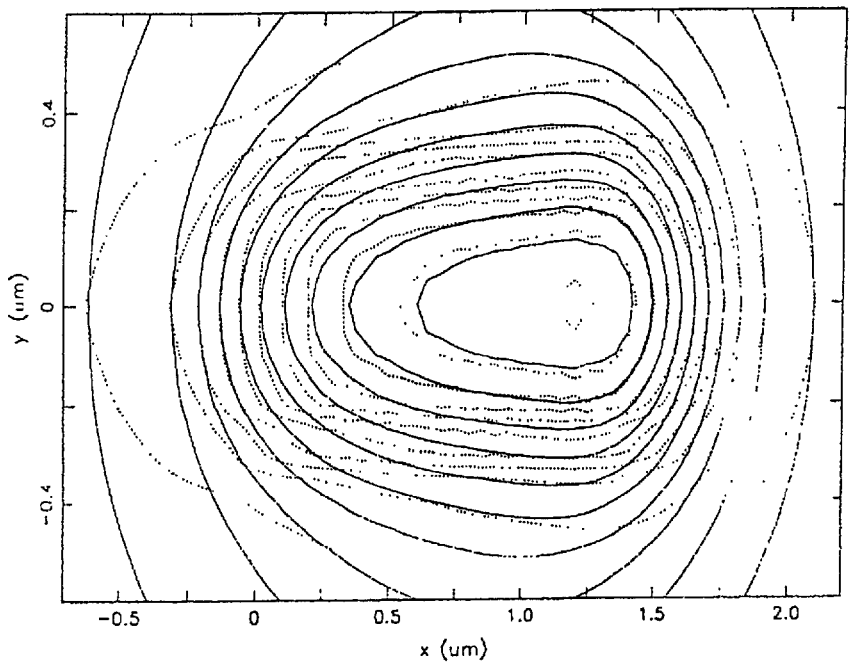
FIG. 7 shows the isotherms for flat and grooved media of a type which may incorporate this invention.

A further novel idea that could, if successful, provide an ideal solution is a compensated ferrimagnet based on Ir or Rh. The ideal structure might be 2 Ir/3 Ni/2 Ir/1 Co repeating to a thickness of 10 nrm, where the numbers in the structure refer to atomic layers. The idea is that the Ir will antiferromagnetically couple the magnetic layers and that the Ni and Co layers will exhibit different temperature dependencies. Fe might be a useful alternative to Co, or a thin Fe layer could replace the 3 Ni layers. In the OAMR media design, optimizing the thermal properties for read and write is critical. To study thermal confinement effects of track-bounding grooves, a thermal simulation was performed on a disc structure with 70 nm wide grooves of depth 160 nm with a track pitch of 700 nm. Conventional MO films, including dielectric and reflector layers, were placed on a polycarbonate substrate. A Gaussian heating spot of FWHM 550 nm was centered on the land between the track-bounding grooves. The side wall slope of the grooves was 70 degrees as measured from the horizontal. The recording film coating was assumed to be conformal, but diminished thermal conductivity on the side wall slope was varied to simulate the effect of less effective film deposition on the side wall. As shown in FIG. 7, when the effective thermal conductivity on the side wall diminished, the grooves became very effective confinement barriers to lateral heat flow. Furthermore, the heat flow was channeled along the land region, particularly in the direction of the trailing edge of the heating spot. Isotherms became much straighter in the cross-track direction, which should be an aid in forming straight magnetization transitions in thermomagnetic writing, or in thermally-assisted magnetic recording with a pole head.

The conclusion of the study is that thermal confinement grooves can be very effective for isolating the laser beam heating to the recording track of interest IF the spot size is comparable to the land width. Also, the grooves tend to create favorable isotherm characteristics for recording on the land region. Simulated thermomagnetic writing shows that a wider writer produces satisfactory mark definition when combined with the thermal confinement of the grooved media.

This system is especially useful in recording data on narrow-grooved media, i.e., media where the data is recorded on wide lands as shown in FIG. 3. As shown in the figure, the write and read layers are deposited on the disc with the result that the side wall layers are very thin. Thus, instead of having the heat from the read spot 152 spread generally circularly as shown by the dark lines 700 in FIG. 7 (as would occur on flat media), the heat spreads in a more elongated, rectangular fashion along the lands, resulting in a more generally rectangular spot for reading data. This enables reading the data using a rectangular head.

Other features and advantages of this invention should be apparent to a person of skill in the art who studies the above disclosure. Therefore, the scope of this invention should be limited only by the following claims.

What is claimed:

1. A data storage system, comprising:
   a source of heat;
   a substrate;
   a write layer disposed above the substrate;
   a copy layer disposed above the write layer; and
   a flying head disposed above the layers and carrying the source of heat for heating a selected spot on the copy and write layers, wherein the write layer comprises a ferromagnetic material selected to have a high coercivity at room temperature and a very high write temperature $T_{write}$ and the copy layer comprises a ferromagnetic material selected to have a coercivity always less than the coercivity of the write layer at the same temperature and a copy temperature $T_{copy}$, substantially less than the write temperature of the write layer; wherein the copy layer is deposited over the write layer by the steps of depositing first the write layer of TbFeCo, and then depositing a copy layer of Co/Pt, and wherein the step of depositing the Co/Pt comprises depositing 0.3 nm Co/1.0 nm Pt repeated 13 times.

2. A system as claimed in claim 1 wherein the Co/Pt superlattice is fabricated by DC magnitron Co sputtering from elemental Co and Pt targets onto a rotating substrate.

3. A system as claimed in claim 2 wherein a Pt layer is used to promote the desired polycrystalline texture of the Co/Pt superlattice copy layer.

4. A system as claimed in claim 2 wherein the TbFeCo composition is approximately $Tb_{24}Fe_{69}Co_7$ atomic percent.

5. A system as claimed in claim 1 wherein the write layer comprises TbFeCo, and the copy layer comprises Fe/Pt super lattice.

6. A system as claimed in claim 1 wherein the write layer comprises TbFeCo, and the copy layer comprises CoFe/Pt super lattice.

7. A system as claimed in claim 1 wherein the system comprises a rotating disc rotating past the flying head and comprising a plurality of concentric lands separated by grooves, each of the lands supporting a data track wherein the data is stored and being approximately, or substantially the width of the spot defined by the source of heat, each of the lands comprising the substrate and the copy layer and write layer, and wherein the side walls of the lands each have a diminished thickness of the copy layer and the write layer relative to the land.

8. A system as claimed in claim 7 further comprising a polycarbonate substrate, and dielectric and reflector layers underlying the copy layer and write layer.

9. A system as claimed in claim 8 wherein the write layer comprises TbFeCo, and the copy layer comprises Co/Pt.

10. A system as claimed in claim 9 further comprising a layer of Pt intermediate the copy layer and write layer for mediating the coupling between these layers.

11. A data storage system comprising a spot size source of heat directed at a rotating disc having a plurality of data storage disc tracks thereon, the disc comprising a substrate, a write layer disposed above the substrate and a copy layer disposed above the write layer the system comprising a flying head disposed above the copy layer and write layer and carrying thereon the source of heat for heating a selected spot on the copy layer and write layer for reading data from the write layer, and wherein the write layer comprises means having a high coercivity at room temperature and a high write temperature wherein the coercivity is low enough to accurately write data on the write layer, and wherein the copy layer comprises means always having a lower coercivity than the write layer at a given temperature, and responsive to a certain defined temperature substantially less than the write temperature of the write layer to be coupled to the write layer and store a data bit already stored in the write layer inset copy layer without destroying the status of the data bit stored in the write layer.

12. A system as claimed in claim 1, wherein the write layer comprises TbFeCo and the copy layer comprises Co/Pt.

13. A system as claimed in claim 12 further comprising an additional inner layer intermediate the copy layer and the write layer to mediate the coupling between the layers.

14. A system as claimed in claim 13, wherein the inner layer comprises Pt.

15. A system as claimed in claim 14 wherein the inner layer comprises a thickness less than or equal to 5 mm.

16. A system as claimed in claim 15, wherein the inner layer is 0.5 to 1.0 nm.

17. A data storage system, comprising:
    a source of heat;
    a substrate;
    a write layer disposed above the substrate;
    a copy layer disposed above the write layer; and
    a flying head disposed above the layers and carrying the source of heat for heating a selected spot on the copy and write layers, wherein the write layer comprises a ferromagnetic material having a high coercivity at room temperature and a high write temperature $T_{write}$, and the copy layer comprises a ferromagnetic material having a coercivity always less than the coercivity of the write layer at the same temperature and a copy temperature $T_{copy}$ substantially less than the write temperature of the write layer.

18. A system as claimed in claim 17 wherein the write layer comprises ThFeCo, which is amorphous, and the copy layer comprises Co/Pt, which is polycrystalline.

19. A system as claimed in claim 18 further comprising an additional inner layer intermediate the copy layer and the write layer to mediate the coupling between the layers.

20. A system as claimed in claim 19 wherein the inner layer comprises Pt.

21. A system as claimed in claim 20 wherein the inner layer comprises a thickness less than or equal to 5 nm.

22. A system as claimed in claim 21 wherein the inner layer is 0.5 to 1.0 nm.

23. A system as claimed in claim 17 wherein the copy layer is deposited over the write layer by the steps of depositing first the write layer of TbFeCo, and then depositing a copy layer of Co/Pt.

24. A system as claimed in claim 23 wherein the step of depositing the Co/Pt comprises depositing 0.3 nm Co/1.0 nm Pt repeated 13 times, and wherein the Co/Pt superlattice is fabricated by DC magnitron Co sputtering from elemental Co and Pt targets onto a rotating substrate.

25. A system as claimed in claim 24 wherein a Pt layer is used to promote the desired polycrystalline texture of the Co/Pt superlattice copy layer.

26. A system as claimed in claim 24 wherein the TbFeCo composition is approximately Tb24Fe69Co7 atomic percent.

27. A system as claimed in claim 23 wherein the write layer comprises ThFeCo, and the copy layer comprises Fe/Pt super lattice.

28. A system as claimed in claim 23 wherein the write layer comprises TbFeCo, and the copy layer comprises CoFc/Pt super lattice.

29. A system as claimed in claim 24 further comprising a polycarbonate substrate, and dielectric and reflector layers underlying the copy layer and write layer.

30. A system as claimed in claim 29 wherein the write layer comprises TbFeCo, and the copy layer comprises Co/Pt.

31. A system as claimed in claim 30 further comprising a layer of Pt intermediate the copy layer and write layer for mediating the coupling between these layers.

32. A system as claimed in claim 1, wherein the copy layer has a coercivity between 1–2 kOe.

33. A system as claimed in claim 11, wherein the copy layer has a coercivity between 1–2 kOe.

34. A system as claimed in claim 17, wherein the copy layer has a coercivity between 1–2 kOe.

35. A system as claimed in claim 11 wherein the write layer comprises TbFeCo and the copy layer comprises Co/Pt.

36. A system as claimed in claim 35 further comprising an additional inner layer intermediate the copy layer and the write layer to mediate the coupling between the layers.

37. A system as claimed in claim 36 wherein the inner layer comprises Pt.

38. A system as claimed in claim 37 wherein the inner layer comprises a thickness less than or equal to 5 nm.

39. A system as claimed in claim 38 wherein the inner layer is 0.5 to 1.0 nm.

40. A system as claimed in claim 11 wherein the copy layer is deposited over the write layer by the steps of depositing first the write layer of TbFeCo, and then depositing a copy layer of Co/Pt.

41. A system as claimed in claim 40 wherein the step of depositing the Co/Pt comprises depositing 0.3 nm Co/1.0 nm Pt repeated 13 times.

42. A system as claimed in claim 41 wherein the Co/Pt superlattice is fabricated by DC magnitron Co sputtering from elemental Co and Pt targets onto a rotating substrate.

43. A system as claimed in claim 42 wherein a Pt layer is used to promote the desired polycrystalline texture of the Co/Pt superlattice copy layer.

44. A system as claimed in claim 42 wherein the TbFeCo composition is approximately $Tb_{24}Fe_{69}CO_7$ atomic percent.

45. A system as claimed in claim 41 wherein the write layer comprises TbFeCo, and the copy layer comprises Fe/Pt super lattice.

46. A system as claimed in claim 41 wherein the write layer comprises TbFeCo, and the copy layer comprises CoFe/Pt super lattice.

47. A system as claimed in claim 11 wherein the system comprises a rotating disc rotating past the flying head and comprising a plurality of concentric lands separated by grooves, each of the lands supporting a data track wherein the data is stored and being approximately, or substantially the width of the spot defined by the source of heat, each of the lands comprising the substrate and the copy layer and write layer, and wherein the side walls of the lands each have a diminished thickness of the copy layer and the write layer relative to the land.

48. A system as claimed in claim 47 further comprising a polycarbonate substrate, and dielectric and reflector layers underlying the copy layer and write layer.

49. A system as claimed in claim 48 wherein the write layer comprises TbFeCo, and the copy layer comprises Co/Pt.

50. A system as claimed in claim 49 further comprising a layer of Pt intermediate the copy layer and write layer for mediating the coupling between these layers.

* * * * *